(12) United States Patent
Chen et al.

(10) Patent No.: US 9,538,079 B2
(45) Date of Patent: Jan. 3, 2017

(54) METHODS AND ELECTRONIC DEVICES ENABLING PANORAMIC PHOTOGRAPHY

(71) Applicant: LENOVO (BEIJING) LIMITED, Beijing (CN)

(72) Inventors: Wenhui Chen, Beijing (CN); Nailei Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 336 days.

(21) Appl. No.: 14/221,554

(22) Filed: Mar. 21, 2014

(65) Prior Publication Data

US 2015/0035941 A1 Feb. 5, 2015

(30) Foreign Application Priority Data

Jul. 31, 2013 (CN) .......................... 2013 1 0327427

(51) Int. Cl.
*H04N 7/00* (2011.01)
*H04N 5/232* (2006.01)
*G06F 3/01* (2006.01)
*G06F 1/16* (2006.01)
*G03B 37/00* (2006.01)

(52) U.S. Cl.
CPC .......... *H04N 5/23238* (2013.01); *G06F 3/017* (2013.01); *H04N 5/23216* (2013.01); *H04N 5/23258* (2013.01); *G03B 37/00* (2013.01); *G06F 1/1694* (2013.01); *G06F 2200/1637* (2013.01)

(58) Field of Classification Search
USPC ...................................... 348/36–37
See application file for complete search history.

(56) References Cited

U.S. PATENT DOCUMENTS

| | | | | |
|---|---|---|---|---|
| 2002/0063799 | A1* | 5/2002 | Ortiz | A63B 71/06 348/559 |
| 2005/0206659 | A1* | 9/2005 | Cutler | G03B 37/00 345/660 |
| 2009/0256919 | A1* | 10/2009 | Kobayashi | H04N 5/232 348/208.7 |
| 2012/0194637 | A1* | 8/2012 | Han | H04N 5/23232 348/36 |

* cited by examiner

*Primary Examiner* — Nigar Chowdhury

(57) ABSTRACT

The present disclosure discloses a method and an electronic device enabling panoramic photography. The method includes: obtaining a first operation; determining whether the first operation meets a first predetermined condition, so as to obtain a first determination result; obtaining parameter information of the electronic device by the sensing unit, when the first determination result is used for representing that the first operation meets the first predetermined condition; further determining whether the parameter information meets a second predetermined condition, so as to obtain a second determination result; controlling the electronic device to enter into the panoramic photography mode, when the second determination result represents that the parameter information meets the second predetermined condition. The method may be applied to enabling the panoramic photography.

14 Claims, 6 Drawing Sheets

METHODS AND ELECTRONIC DEVICES ENABLING PANORAMIC PHOTOGRAPHY

CROSS REFERENCE TO RELATED APPLICATIONS

This application claims priority to Chinese National Application No. 201310327427.8 filed on Jul. 31, 2013, the entire contents of which are incorporated herein by reference.

TECHNICAL FIELD

The present disclosure relates to a field of communication techniques, and particularly, to methods and electronic devices enabling panoramic photography.

BACKGROUND

A viewing range of a normal camera is limited, i.e., one shot image may only cover a scene within a fixed range.

In order that the captured image may cover a scene within a larger range, a camera application in the electronic device may be configured with a panoramic photography mode, i.e., in which a scene of a larger angle (e.g. 360°) may be captured in one image. Particularly, a user may select the panoramic photography mode after the photography application is started; keep pressing a shutter key and move the electronic device for photographing, when the panoramic photography mode is selected and the photographing is determined to be started; and release the shutter key after the photographing is finished. Thus, a panoramic image may be obtained.

During the panoramic photographing procedure as described above, the inventor found at least problems as follows.

When the electronic device is used for photographing, the panoramic photographing procedure may be entered only if the panoramic photography mode is selected, which adds a usage step for the user and reduces the user experience.

SUMMARY

Embodiments of the present disclosure provide methods and electronic devices enabling panoramic photography. When the user needs to photograph, a panoramic photography process may be automatically entered without additionally selecting a panoramic photography mode, which may simplify usage steps for the user, and improve the user experience.

In order to achieve the above object, the embodiments of the present disclosure may provide technical solutions as follows.

A method of enabling panoramic photography, applied to an electronic device including a sensing unit, the method including steps of:

obtaining a first operation;

determining whether the first operation meets a first predetermined condition, so as to obtain a first determination result;

obtaining parameter information of the electronic device by the sensing unit, when the first determination result is used for representing that the first operation meets the first predetermined condition;

further determining whether the parameter information meets a second predetermined condition, so as to obtain a second determination result;

controlling the electronic device to enter into the panoramic photography mode, when the second determination result represents that the parameter information meets the second predetermined condition.

An electronic device including: a sensing unit;

a first obtaining unit configured to obtain a first operation;

a first determination unit configured to determine whether the first operation meets a first predetermined condition, so as to obtain a first determination result;

a second obtaining unit configured to obtain parameter information of the electronic device by the sensing unit, when the first determination result is used for representing that the first operation meets the first predetermined condition;

a second determination unit configured to further determine whether the parameter information meets a second predetermined condition, so as to obtain a second determination result;

an execution unit configured to control the electronic device to enter into the panoramic photography mode, when the second determination result represents that the parameter information meets the second predetermined condition.

The embodiments of the present disclosure provide the method and the electronic device enabling the panoramic photography. With the above solutions, when the user needs to perform the panoramic photography in the panoramic photography mode, he does not need to additionally select the panoramic photography mode, and the panoramic photography mode may be started automatically as long as both respective operations of the user and the parameter information of the electronic device may meet the first predetermined condition and the second predetermined condition respectively. Thus, the operation steps of the user may be simplified and the user experience may be improved.

BRIEF DESCRIPTION OF THE DRAWINGS

In order to illustrate the technical solutions in the embodiments of the present disclosure more clearly, drawings used for description on the embodiments will be introduced simply. Obviously, the drawings are only for some embodiments of the present disclosure. Other drawings may also be obtained according to these drawings by the skilled in the art without any creative labor.

DETAILED DESCRIPTION

Hereinafter, technical solutions in the embodiments of the present disclosure will be described clearly and completely, in connection with the drawings of the embodiments in the present disclosure. Obviously, the embodiments as described below are only a part of embodiments of the present disclosure, but not all of the embodiments thereof. Based on the embodiments of the present disclosure, all of other embodiments obtained by the skilled in the art without any creative labor fall into the protection scope of the present disclosure.

When the user needs to perform the panoramic photography, the panoramic photographing procedure may be entered only if the panoramic photography mode is selected, which adds a usage step for the user and makes the user experience bad.

Figure 1:
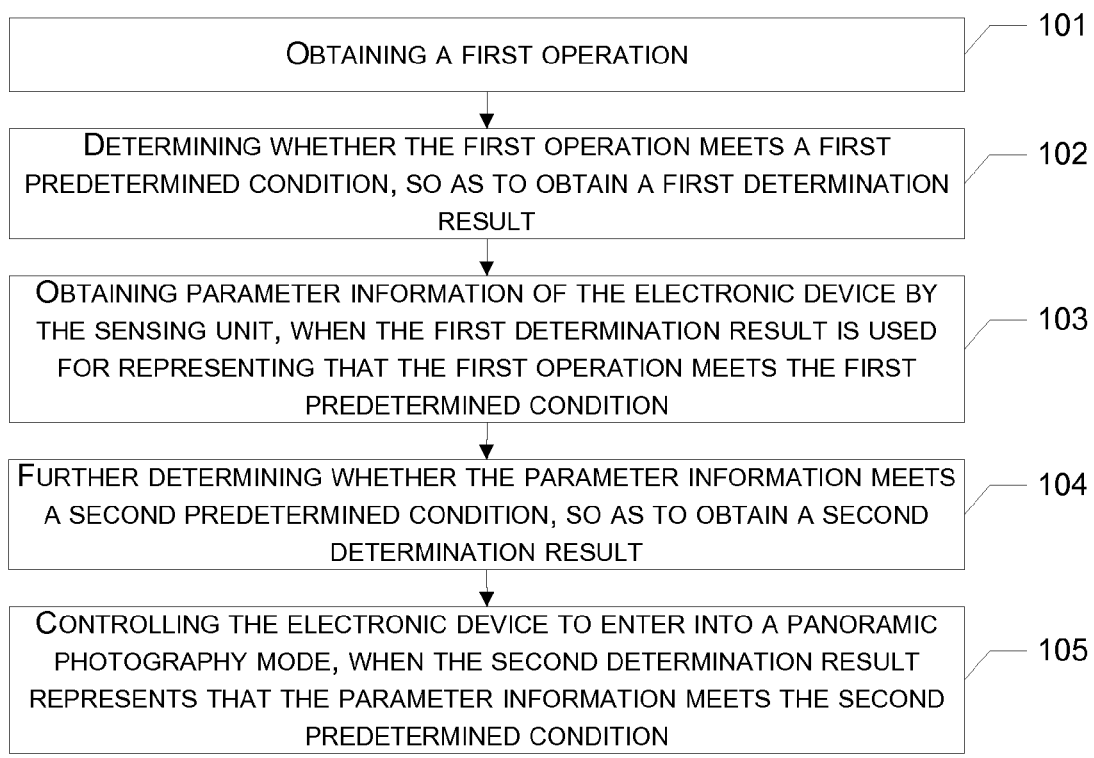
FIG. 1 shows a flowchart of a method of enabling panoramic photography provided by an embodiment of the present disclosure.

In order to solve the above problem, the present embodiment provides a method of enabling panoramic photography, applied to an electronic device including a sensing unit. As shown in FIG. 1, the method may include:

Step 101, obtaining a first operation;

Before the electronic device enters the panoramic photography mode, it needs firstly to be determined whether a condition of entering the panoramic photography mode is met. A parameter for the condition may include the first operation.

In order to pave for subsequent steps, the present step is to obtain the first operation firstly.

Step 102, determining whether the first operation meets a first predetermined condition, so as to obtain a first determination result;

Step 103, obtaining parameter information of the electronic device by the sensing unit, when the first determination result is used for representing that the first operation meets the first predetermined condition;

The parameter for the condition of entering the panoramic photography mode may not only concern the first operation, but also concern parameter information of the electronic device. Both the first operation and the parameter information may be formed after respective operations are performed by the user on the electronic device.

Step 104 of further determining whether the parameter information meets a second predetermined condition, so as to obtain a second determination result;

Step 105 of controlling the electronic device to enter into the panoramic photography mode, when the second determination result represents that the parameter information meets the second predetermined condition.

With the above solution, when the user needs to perform the panoramic photography in the panoramic photography mode, he does not need to additionally select the panoramic photography mode, and the panoramic photography mode may be started automatically as long as both respective operations of the user and the parameter information of the electronic device may meet the first predetermined condition and the second predetermined condition respectively. Thus, the operation steps of the user may be simplified and the user experience may be improved.

The present embodiment may provide another method of enabling the panoramic photography. This method further extends the method as shown in FIG. 1. Hereinafter, this method will be described in detail with three embodiments, in which the parameter information in Embodiment One may be a rotational angle of the electronic device, the parameter information in Embodiment Two may be a duration of variable motion performed by the electronic device, and the parameter information in Embodiment Three may be an acceleration of the electronic device.

Further, in Embodiments One, Two, and Three, the electronic device may have an image collection unit and can render an interactive object. The interactive object may be used for controlling the electronic device to collect images by the image collection unit. The first operation is an operation of touching the interactive object by the user.

Embodiment One

Figure 2:
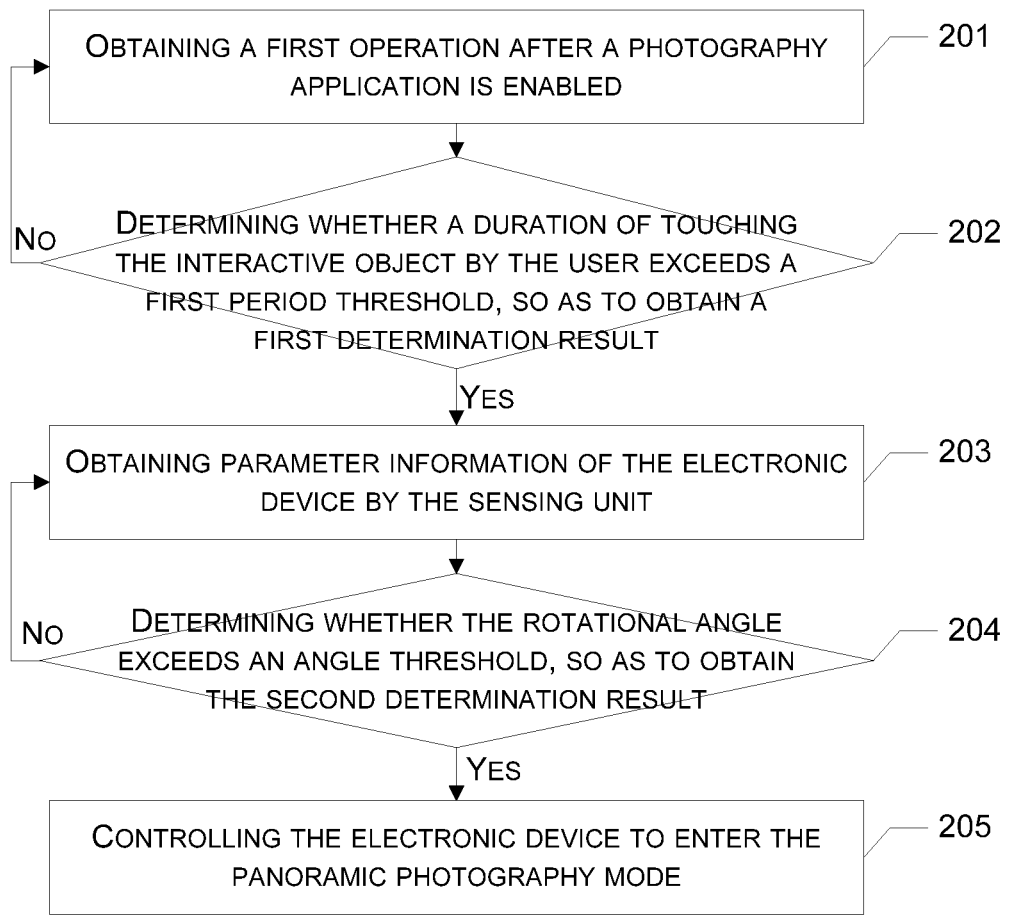
FIG. 2 shows a flowchart of a method of enabling panoramic photography provided by Embodiment One of the present disclosure.

As shown in FIG. 2, the method of enabling the panoramic photography provided by the present embodiment may include:

Step 201, obtaining a first operation after a photography application is enabled;

In which, the first operation may be an operation of touching an interactive object by the user.

As an implementation of the present embodiment, the interactive object may be a shutter key. The shutter key may be an entity shutter key arranged on the electronic device, and may also be a virtual shutter key displayed on a display unit of the electronic device. The first operation may be an operation of pressing the shutter key by the user.

Additionally, the image collection device may be controlled wirelessly. For example, an instruction may be sent to the image collection device by a remote controller, the image collection device may receive the instruction by a wireless receiving device, and perform a corresponding operation according to the instruction, i.e., the interactive object is the wireless receiving device.

Step 202, determining whether a duration of touching the interactive object by the user exceeds a first period threshold, so as to obtain a first determination result. If the first determination result is Yes, the method proceeds to Step 203. Otherwise, the method proceeds to Step 201.

Generally, since the panoramic image obtained by the user after the panoramic photography is an image collected between a time of pressing the shutter and a time of releasing the shutter, the user needs to keep pressing the shutter key for a long time when the panoramic photography is performed. Therefore, it may be firstly determined according to the duration of touching the interactive object by the user whether the user needs to perform the panoramic photography. After it is determined that the user needs to perform the panoramic photography, the panoramic photography mode is entered.

The present embodiment does not limit the first period threshold, which may be set according to actual requirements, e.g., 2 s, 3 s etc. The description thereof will be omitted here.

Step 203, obtaining parameter information of the electronic device by the sensing unit.

Since the user not only needs to press the shutter key but also needs to rotate the electronic device to facilitate collecting images of respective angles when the panoramic photography is performed, the condition parameter for determining whether the panoramic photography mode is entered may not only include the time during which the interactive object is continuously touched, but also include the rotational angle of the electronic device during the interactive object is continuously touched, i.e., the parameter information is the angle of the electronic device rotated within the first period threshold, in which a starting time of the first period threshold is a starting time of the interactive object being continuously touched (i.e., the time when the interactive object starts to be touched).

When the time during which the interactive object is continuously touched exceeds the first period threshold, it may be determined according to the angle of the electronic device rotated within the first period threshold whether the user needs to perform the panoramic photography.

Figure 3:
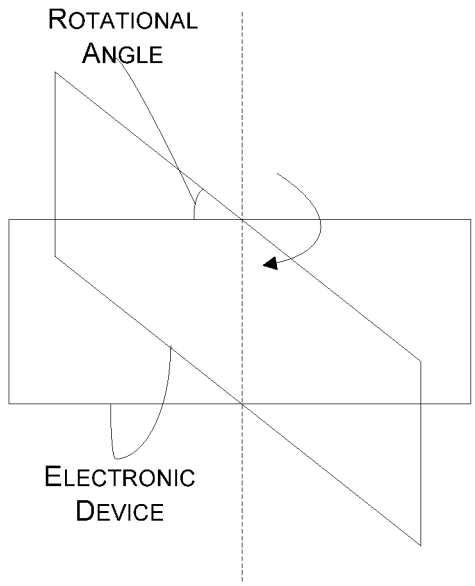
FIG. 3 shows a schematic diagram of a rotational angle of an electronic device in Embodiment Two of the present disclosure.

As shown in FIG. 3, which is a schematic diagram of the electronic device performing an angle rotation within the first period threshold, FIG. 3 may represent a position of the electronic device at the time when the interactive device starts to be touched, and a position of the electronic device when the first period threshold is reached. Comparison of these two positions may obtain the rotational angle of the electronic device rotated within the first period threshold. The electronic device may rotate along any axis, e.g., rotate as shown in FIG. 3. The electronic device may also be a user handheld electronic device, and may rotate taking the user as the axis.

Further, obtaining the rotational angle of the electronic device by the sensing unit may include:

obtaining, by a gyroscope, the rotational angle of the electronic device within the first period threshold.

The present embodiment does not limit the method of obtaining the rotational angle of the electronic device by the gyroscope, which may be techniques well-known by the skilled in the art. The description thereof will be omitted here.

Further, obtaining the rotational angle of the electronic device by the sensing unit may further include:

obtaining a first image collected by the image collection unit at a time when the user starts to touch the interactive object; obtaining a second image collected by the image collection unit at a time when the first period threshold is ended; obtaining the rotational angle of the electronic device within the first period threshold, according to contents displayed by the first image and the second image.

For example, the time when the user starts to touch the interactive object is 13:00:00 and the first period threshold is 30 s, then the time when the first period threshold is ended is 13:00:30, the first image is the image collected by the image collection unit at 13:00:00, and the second image is the image collected by the image collection unit at 13:00:30. The first image and the second image may be compared to obtain a difference between the first image and the second image, according to which the rotational angle of the electronic device may be obtained.

In particular, if the right ahead of the user is a parking lot, the right side of the user is a center street park, the image of the parking lot is in the center of the first image and the image of the center street park is in the center of the second image, it may be deduced according to the first image and the second image that the electronic device may rotate 90° or 270°.

The present embodiment does not limit the method of obtaining the rotational angle of the electronic device according to the first image and the second image, which may be techniques well-known by the skilled in the art and may be set according to actual requirements. The description thereof will be omitted here.

Step 204, determining whether the rotational angle exceeds an angle threshold, so as to obtain the second determination result. If the second determination result is Yes, the parameter information meets the second predetermined condition and the method proceeds to Step 205. Otherwise, the parameter information does not meet the second predetermined condition, and the method proceeds to Step 203.

The present embodiment does not limit the angle threshold, which may be set according to actual requirements, e.g., 15°. The description thereof will be omitted here.

Step 205, controlling the electronic device to enter the panoramic photography mode.

As an implementation of the present embodiment, when the time during which the user continuously touch the interactive device exceeds the first period threshold and the rotational angle of the electronic device within the first period threshold exceeds the angle threshold, it illustrates that the user may need to perform the panoramic photography, and thus the electronic device enters the panoramic photography mode.

With the above technical solution, when the user needs to perform the panoramic photography in the panoramic photography mode, he does not need to additionally select the panoramic photography mode, and the electronic device may automatically start the panoramic photography mode as long as the user continuously touches the interactive device (the time for continuously touching exceeding the first predetermined period) and the electronic device is rotated within the first period threshold so that the rotational angle of the electronic device exceeds the angle threshold. Thus, the operation steps of the user may be simplified and the user experience may be improved.

Embodiment Two

Figure 4:
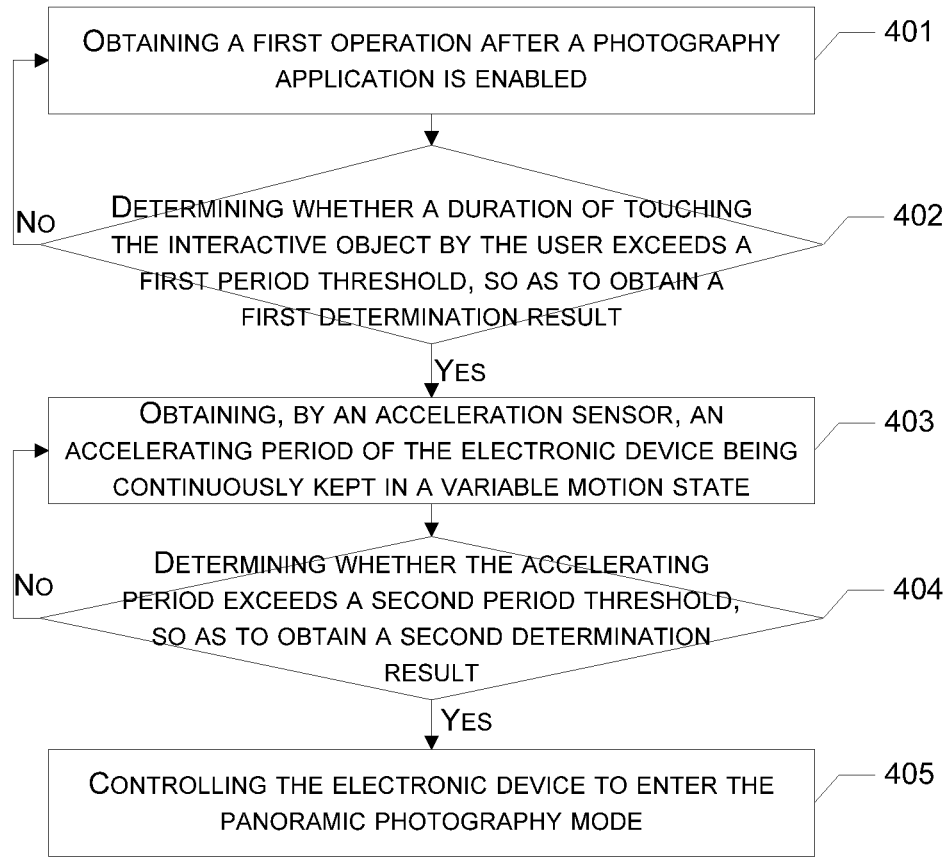
FIG. 4 shows a flowchart of a method of enabling panoramic photography provided by Embodiment Two of the present disclosure.

As shown in FIG. 4, the method of enabling the panoramic photography provided by the present embodiment may include:

Step 401, obtaining a first operation after a photography application is enabled;

In which, the first operation may be an operation of touching an interactive object by the user.

As an implementation of the present embodiment, the interactive object may be a shutter key. The shutter key may be an entity shutter key arranged on the electronic device, and may also be a virtual shutter key displayed on a display unit of the electronic device. The first operation may be an operation of pressing the shutter key by the user.

Additionally, the image collection device may be controlled wirelessly. For example, an instruction may be sent to the image collection device by a remote controller, the image collection device may receive the instruction by a wireless receiving device, and perform a corresponding operation according to the instruction, i.e., the interactive object is the wireless receiving device.

Step 402, determining whether a duration of touching the interactive object by the user exceeds a first period threshold, so as to obtain a first determination result. If the first determination result is Yes, the method proceeds to Step 403. Otherwise, the method proceeds to Step 401.

Generally, since the panoramic image obtained by the user after the panoramic photography is an image collected between a time of pressing the shutter and a time of releasing the shutter, the user needs to keep pressing the shutter key for a long time when the panoramic photography is performed. Therefore, it may be firstly determined according to the duration of touching the interactive object by the user whether the user needs to perform the panoramic photography. After it is determined that the user needs to perform the panoramic photography, the panoramic photography mode is entered.

The present embodiment does not limit the first period threshold, which may be set according to actual requirements, e.g., 2 s, 3 s etc. The description thereof will be omitted here.

Step 403, obtaining, by an acceleration sensor, an accelerating period of the electronic device being continuously kept in a variable motion state.

Since the user needs to rotate the electronic device when the user handholds the electronic device for panoramic photography, when the user rotates the electronic device, it is difficult for the user to keep the electronic device in an uniform motion, and thus the electronic device is possible to be kept in the variable motion state. Therefore, the condition parameter for determining whether the panoramic photography mode is entered may not only include the time during which the interactive object is continuously touched, but also include the accelerating period of the electronic device being continuously kept in the variable motion state, i.e., the parameter information is the accelerating period of the electronic device being continuously kept in the variable motion state within the first period threshold, in which a starting time of the first period threshold is a starting time of the interactive object being continuously touched (i.e., the time when the interactive object starts to be touched).

Step 404, determining whether the accelerating period exceeds a second period threshold, so as to obtain a second determination result. If the second determination result is Yes, the parameter information meets a second predetermined condition, and the method proceeds to Step 405. Otherwise, the parameter information does not meet the second predetermined condition, and the method proceeds to Step 403.

The present embodiment does not limit the second period threshold, which may be set according to actual requirements, e.g., 2 s, 3 s etc. The description thereof will be omitted here.

Step 405, controlling the electronic device to enter the panoramic photography mode.

As an implementation of the present embodiment, when the time during which the user continuously touch the interactive device exceeds the first period threshold and the period, during which the electronic device is continuously kept in the variable motion state, within the first period threshold exceeds the second period threshold, it illustrates that the user may need to perform the panoramic photography, and thus the electronic device enters the panoramic photography mode.

With the above technical solution, when the user needs to perform the panoramic photography in the panoramic photography mode, he does not need to additionally select the panoramic photography mode, and the electronic device may automatically start the panoramic photography mode as long as the user continuously touches the interactive device (the time for continuously touching exceeding the first predetermined period) and the accelerating period, during which the electronic device is continuously kept in the variable motion state, within the first period threshold exceeds the second period threshold. Thus, the operation steps of the user may be simplified and the user experience may be improved.

Embodiment Three

Figure 5:
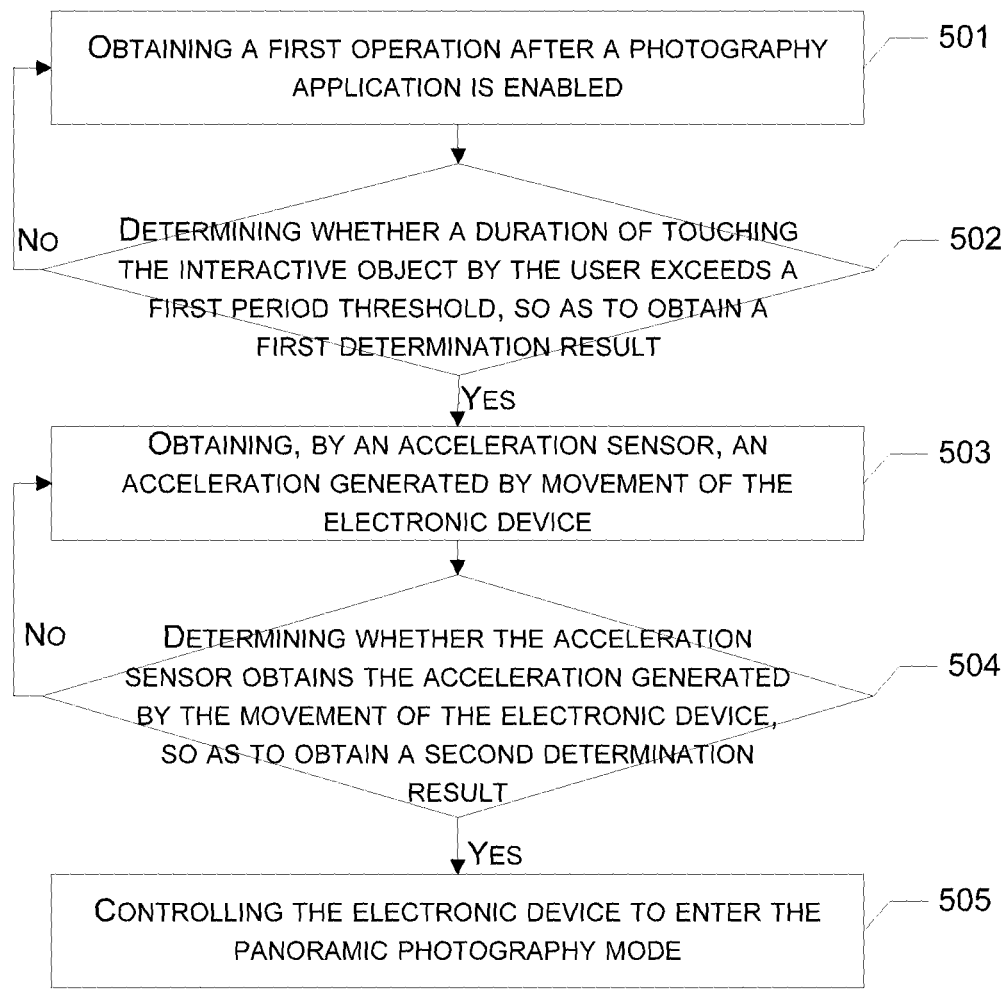
FIG. 5 shows a flowchart of a method of enabling panoramic photography provided by Embodiment Three of the present disclosure.

As shown in FIG. 5, the method of enabling the panoramic photography provided by the present embodiment may include:

Step 501, obtaining a first operation after a photography application is enabled;

In which, the first operation may be an operation of touching an interactive object by the user.

As an implementation of the present embodiment, the interactive object may be a shutter key. The shutter key may be an entity shutter key arranged on the electronic device, and may also be a virtual shutter key displayed on a display unit of the electronic device. The first operation may be an operation of pressing the shutter key by the user.

Additionally, the image collection device may be controlled wirelessly. For example, an instruction may be sent to the image collection device by a remote controller, the image collection device may receive the instruction by a wireless receiving device, and perform a corresponding operation according to the instruction, i.e., the interactive object is the wireless receiving device.

Step 502, determining whether a duration of touching the interactive object by the user exceeds a first period threshold, so as to obtain a first determination result. If the first determination result is Yes, the method proceeds to Step 503. Otherwise, the method proceeds to Step 501.

Generally, since the panoramic image obtained by the user after the panoramic photography is an image collected between a time of pressing the shutter and a time of releasing the shutter, the user needs to keep pressing the shutter key for a long time when the panoramic photography is performed. Therefore, it may be firstly determined according to the duration of touching the interactive object by the user whether the user needs to perform the panoramic photography. After it is determined that the user needs to perform the panoramic photography, the panoramic photography mode is entered.

The present embodiment does not limit the first period threshold, which may be set according to actual requirements, e.g., 2 s, 3 s etc. The description thereof will be omitted here.

Step 503, obtaining, by an acceleration sensor, an acceleration generated by movement of the electronic device.

Since the electronic device may also horizontally move when the user performs the panoramic photography, the electronic device may switch from a still state to a moving state only if there is an accelerating motion required. Therefore, the condition parameter for determining whether the panoramic photography mode is entered may not only include the time during which the interactive object is continuously touched, but also include the determination whether the accelerating motion is performed by the electronic device when the interactive object is continuously touched, i.e., the parameter information is the acceleration of the electronic device within the first period threshold, in which a starting time of the first period threshold is a starting time of the interactive object being continuously touched (i.e., the time when the interactive object starts to be touched).

Step 504, determining whether the acceleration sensor obtains the acceleration generated by the movement of the electronic device, so as to obtain a second determination result. If the second determination result is Yes, the parameter information meets a second predetermined condition, and the method proceeds to Step 505. Otherwise, the parameter information does not meet the second predetermined condition, and the method proceeds to Step 503.

Step 505, controlling the electronic device to enter the panoramic photography mode.

As an implementation of the present embodiment, when the time during which the user continuously touch the interactive device exceeds the first period threshold and the electronic device obtains the acceleration generated by its movement within the first period threshold, it illustrates that the user may need to perform the panoramic photography, and thus the electronic device enters the panoramic photography mode.

Hereinafter, the present embodiment will be described for a specific scene.

When a group photo is photographed, images of all people cannot be collected since the viewing range of the image collection device is too small. Therefore, a row of track may be built on the ground, so that the image collection device may slide on the track for collecting the images of all the people by the image collection device. In the scene, the user may (but not limited to) control, by the remote device, the image collection device to photograph. Additionally, the user may also control, by the remote device, the electronic device to move on the track. Since the electronic device is in the still state before it receives a moving instruction, the electronic device will generate an acceleration by switching from the still state to the moving state (i.e., in the accelerating motion state). When the acceleration sensor senses and detects the acceleration, the panoramic photography mode is entered.

With the above technical solution, when the user needs to perform the panoramic photography in the panoramic photography mode, he does not need to additionally select the panoramic photography mode, and the electronic device may automatically start the panoramic photography mode as long as the user continuously touches the interactive device (the time for continuously touching exceeding the first predetermined period) and the electronic device obtains the acceleration generated by its movement within the first period threshold. Thus, the operation steps of the user may be simplified and the user experience may be improved.

Hereinafter, an apparatus embodiment to be described later will be provided. The apparatus embodiment corresponds to the method embodiment as described previously.

Figure 6:
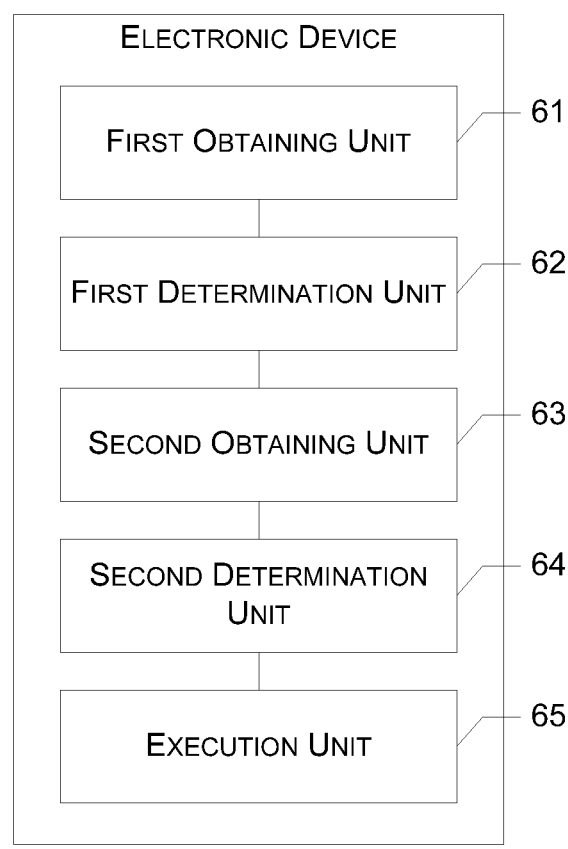
FIG. 6 illustratively shows a structure diagram of an electronic device provided by an embodiment of the present disclosure.

The present embodiment provides an electronic device, in which a sensing unit may be arranged. As shown in FIG. 6, the electronic device may further include:

a first obtaining unit 61 configured to obtain a first operation;

a first determination unit 62 configured to determine whether the first operation meets a first predetermined condition, so as to obtain a first determination result;

a second obtaining unit 63 configured to obtain parameter information of the electronic device by the sensing unit, when the first determination result is used for representing that the first operation meets the first predetermined condition;

a second determination unit 64 configured to further determine whether the parameter information meets a second predetermined condition, so as to obtain a second determination result;

an execution unit 65 configured to control the electronic device to enter into the panoramic photography mode, when the second determination result represents that the parameter information meets the second predetermined condition.

With the above solution, when the user needs to perform the panoramic photography in the panoramic photography mode, he does not need to additionally select the panoramic photography mode, and the panoramic photography mode may be started automatically as long as both respective operations of the user and the parameter information of the electronic device may meet the first predetermined condition and the second predetermined condition respectively. Thus, the operation steps of the user may be simplified and the user experience may be improved.

Figure 7:
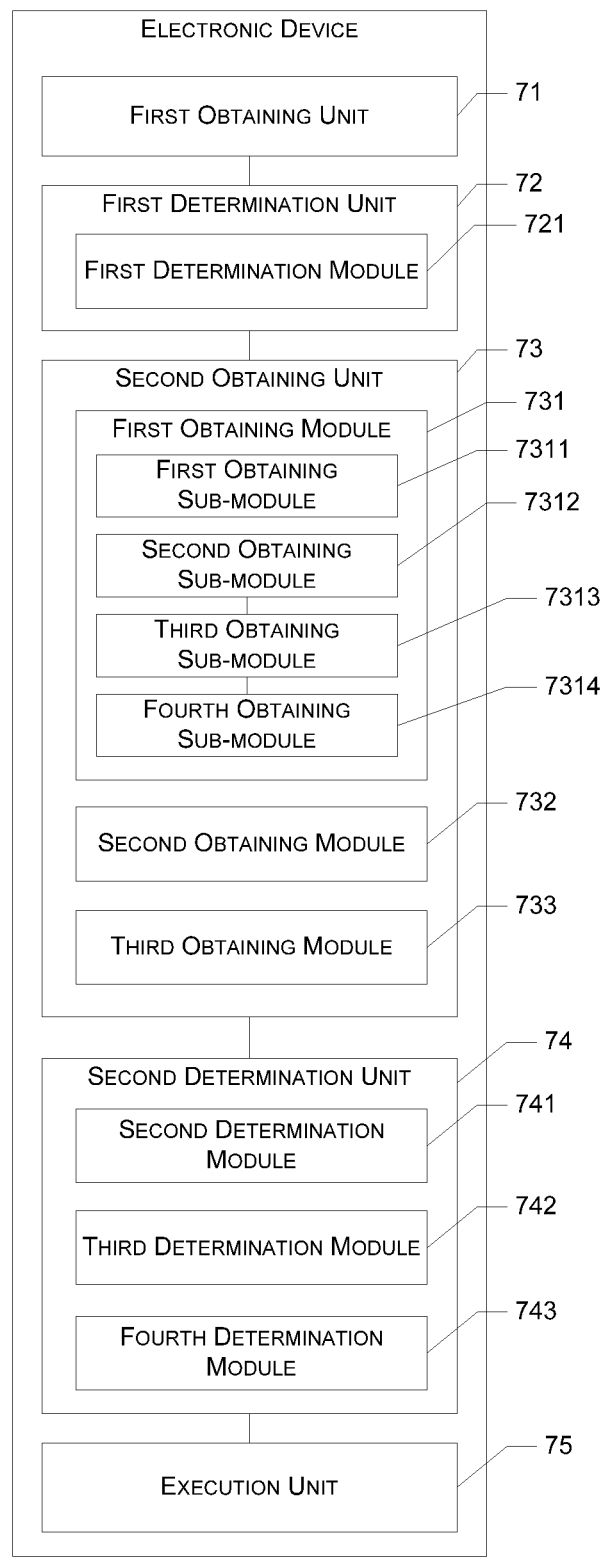
FIG. 7 illustratively shows a structure diagram of another electronic device provided by an embodiment of the present disclosure.

Another embodiment provides another electronic device, which further extends the electronic device of FIG. 6. As shown in FIG. 7, the electronic device may include:

a first obtaining unit 71 configured to obtain a first operation;

a first determination unit 72 configured to determine whether the first operation meets a first predetermined condition, so as to obtain a first determination result;

a second obtaining unit 73 configured to obtain parameter information of the electronic device by the sensing unit, when the first determination result is used for representing that the first operation meets the first predetermined condition;

a second determination unit 74 configured to further determine whether the parameter information meets a second predetermined condition, so as to obtain a second determination result;

an execution unit 75 configured to control the electronic device to enter into the panoramic photography mode, when the second determination result represents that the parameter information meets the second predetermined condition.

Further, the electronic device may have an image collection unit and can render an interactive object. The interactive object may be used for controlling the electronic device to collect images by the image collection unit;

the first operation obtained by the first obtaining unit 71 is an operation of touching the interactive object by the user;

the first determination unit 72 may include:

a first determination module 721 configured to determine whether a duration of touching the interactive object by the user exceeds a first period threshold, so as to obtain a first determination result;

wherein if the first determination result is Yes, the first operation meets the first predetermined condition.

Further, the second obtaining unit 73 may include:

a first obtaining module 731 configured to obtain a rotational angle of the electronic device by the sensing unit;

the second determination unit 74 may further include:

a second determination module 741 configured to determine whether the rotational angle exceeds an angle threshold, so as to obtain the second determination result;

wherein if the second determination result is Yes, the parameter information meets the second predetermined condition.

Further, the first obtaining unit 731 may include:

a first obtaining sub-module 7311 configured to obtain, by a gyroscope, the rotational angle of the electronic device within the first period threshold;

Further, the first obtaining unit 731 may include:

a second obtaining sub-module 7312 configured to obtain a first image collected by the image collection unit at a time when the user starts to touch the interactive object;

a third obtaining sub-module 7313 configured to obtain a second image collected by the image collection unit at a time when the first period threshold is ended;

a fourth obtaining sub-module 7314 configured to obtain the rotational angle of the electronic device within the first period threshold, according to contents displayed by the first image and the second image.

Further, the second obtaining unit 73 may include:

a second obtaining module 732 configure to obtain, by an acceleration sensor, an accelerating period of the electronic device being continuously kept in a variable motion state;

the second determination unit 74 may include:

a third determination module 742 configured to determine whether the accelerating period exceeds a second period threshold, so as to obtain a second determination result;

wherein if the second determination result is Yes, the parameter information meets a second predetermined condition.

Further, the second obtaining unit 73 may include:

a third obtaining module 733 configured to obtain, by an acceleration sensor, an acceleration generated by movement of the electronic device within the first period threshold;

the second determination unit 74 may include:

a fourth determination module 743 configured to determine whether the acceleration sensor obtains the acceleration generated by the movement of the electronic device, so as to obtain a second determination result.

Wherein if the acceleration is obtained by the acceleration sensor, the parameter information meets a second predetermined condition.

With the above solution, when the user needs to perform the panoramic photography in the panoramic photography mode, he does not need to additionally select the panoramic photography mode, and the panoramic photography mode may be started automatically as long as both respective operations of the user and the parameter information of the electronic device may meet the first predetermined condition and the second predetermined condition respectively. Thus, the operation steps of the user may be simplified and the user experience may be improved.

According to the above description on the implementations, the skilled in the art may understand clearly that the present disclosure may be implemented by means of software and necessary general-purpose hardware. Of course, the present disclosure may also be implemented by hardware. However, the former implementation is preferred in most cases. Based on such understandings, the technical solutions of the present disclosure or a part thereof may substantially be embodied in a form of a software product. The computer software product may be stored in a readable storage medium, such as a floppy disk, a hard disk or an optical disk of the computer etc., including several instructions for causing the computer device (which may be a PC, a server or a network device etc.) to execute the methods of various embodiments in the present disclosure.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

The invention claimed is:

1. A method of enabling panoramic photography, applied to an electronic device including a sensing unit, the method comprises steps of:
   obtaining a first operation;
   determining whether the first operation meets a first predetermined condition, so as to obtain a first determination result;
   obtaining parameter information of the electronic device by the sensing unit, when the first determination result is used for representing that the first operation meets the first predetermined condition;
   further determining whether the parameter information meets a second predetermined condition, so as to obtain a second determination result; and
   controlling the electronic device to enter into a panoramic photography mode, when the second determination result represents that the parameter information meets the second predetermined condition, wherein the step of obtaining the parameter information of the electronic device by the sensing unit comprises a step of:
   obtaining a rotational angle of the electronic device by the sensing unit;
   the step of further determining whether the parameter information meets the second predetermined condition so as to obtain the second determination result comprises a step of:
   determining whether the rotational angle exceeds an angle threshold, so as to obtain the second determination result;
   wherein if the second determination result is Yes, the parameter information meets the second predetermined condition.

2. The method of enabling panoramic photography according to claim 1, wherein the electronic device has an image collection unit and renders an interactive object, the interactive object being used for controlling the electronic device to collect images by the image collection unit;
   the first operation is an operation of touching the interactive object by the user;
   the step of determining whether the first operation meets the first predetermined condition so as to obtain the first determination result comprises a step of:
   determining whether a duration of touching the interactive object by the user exceeds a first period threshold, so as to obtain the first determination result;
   wherein if the first determination result is Yes, the first operation meets the first predetermined condition.

3. The method of enabling panoramic photography according to claim 2, wherein the step of obtaining the parameter information of the electronic device by the sensing unit comprises a step of:
   obtaining, by an acceleration sensor, an accelerating period of the electronic device being continuously kept in a variable motion state;
   the step of further determining whether the parameter information meets the second predetermined condition so as to obtain the second determination result comprises steps of:
   determining whether the accelerating period exceeds a second period threshold, so as to obtain a second determination result;
   wherein if the second determination result is Yes, the parameter information meets the second predetermined condition.

4. The method of enabling panoramic photography according to claim 2, wherein the step of obtaining the parameter information of the electronic device by the sensing unit comprises a step of:
   obtaining, by an acceleration sensor, an acceleration generated by movement of the electronic device within the first period threshold;
   the step of further determining whether the parameter information meets the second predetermined condition so as to obtain the second determination result comprises a step of:
   determining whether the acceleration sensor obtains the acceleration generated by the movement of the electronic device, so as to obtain the second determination result;
   wherein if the acceleration is obtained by the acceleration sensor, the parameter information meets the second predetermined condition.

5. The method of enabling panoramic photography according to claim 1, wherein the step of obtaining the rotational angle of the electronic device by the sensing unit comprises a step of:
obtaining, by a gyroscope, the rotational angle of the electronic device within the first period threshold.

6. The method of enabling panoramic photography according to claim 1, wherein the step of obtaining the rotational angle of the electronic device by the sensing unit comprises steps of:
obtaining a first image collected by the image collection unit at a time when the user starts to touch the interactive object;
obtaining a second image collected by the image collection unit at a time when the first period threshold is ended; and
obtaining the rotational angle of the electronic device within the first period threshold, according to contents displayed by the first image and the second image.

7. The method of enabling panoramic photography according to claim 1, wherein the step of obtaining the first operation comprises a step of:
obtaining the first operation after a photography application is enabled.

8. An electronic device, comprising a sensing unit, and further comprising:
a first obtaining unit configured to obtain a first operation;
a first determination unit configured to determine whether the first operation meets a first predetermined condition, so as to obtain a first determination result;
a second obtaining unit configured to obtain parameter information of the electronic device by the sensing unit, when the first determination result is used for representing that the first operation meets the first predetermined condition;
a second determination unit configured to further determine whether the parameter information meets a second predetermined condition, so as to obtain a second determination result;
an execution unit configured to control the electronic device to enter into the panoramic photography mode, when the second determination result represents that the parameter information meets the second predetermined condition,
wherein the second obtaining unit comprises:
a first obtaining module configured to obtain a rotational angle of the electronic device by the sensing unit;
the second determination unit further comprises:
a second determination module configured to determine whether the rotational angle exceeds an angle threshold, so as to obtain the second determination result;
wherein if the second determination result is Yes, the parameter information meets the second predetermined condition.

9. The electronic device according to claim 8, wherein the electronic device has an image collection unit and is configured to render an interactive object, the interactive object being used for controlling the electronic device to collect images by the image collection unit;
the first operation obtained by the first obtaining unit is an operation of touching the interactive object by the user;
the first determination unit comprises:
a first determination module configured to determine whether a duration of touching the interactive object by the user exceeds a first period threshold, so as to obtain the first determination result;
wherein if the first determination result is Yes, the first operation meets the first predetermined condition.

10. The electronic device according to claim 9, wherein the second obtaining unit comprises:
a second obtaining module configured to obtain, by an acceleration sensor, an accelerating period of the electronic device being continuously kept in a variable motion state;
the second determination unit comprises:
a third determination module configured to determine whether the accelerating period exceeds a second period threshold, so as to obtain a second determination result;
wherein if the second determination result is Yes, the parameter information meets the second predetermined condition.

11. The electronic device according to claim 9, wherein the second obtaining unit comprises:
a third obtaining module configured to obtain, by an acceleration sensor, an acceleration generated by movement of the electronic device within the first period threshold;
the second determination unit comprises:
a fourth determination module configured to determine whether the acceleration sensor obtains the acceleration generated by the movement of the electronic device, so as to obtain the second determination result;
wherein if the acceleration is obtained by the acceleration sensor, the parameter information meets the second predetermined condition.

12. The electronic device according to claim 8, wherein the first obtaining module comprises:
a first obtaining sub-module configured to obtain, by a gyroscope, the rotational angle of the electronic device within the first period threshold.

13. The electronic device according to claim 8, wherein the first obtaining module comprises:
a second obtaining sub-module configured to obtain a first image collected by the image collection unit at a time when the user starts to touch the interactive object;
a third obtaining sub-module configured to obtain a second image collected by the image collection unit at a time when the first period threshold is ended;
a fourth obtaining sub-module configured to obtain the rotational angle of the electronic device within the first period threshold, according to contents displayed by the first image and the second image.

14. The electronic device according to claim 8, wherein the first obtaining unit is particularly used for obtaining the first operation after a photography application is enabled.

* * * * *